United States Patent
Mayrhofer

(10) Patent No.: US 8,196,719 B2
(45) Date of Patent: Jun. 12, 2012

(54) SINTERED BRAKE LINING

(75) Inventor: Gerhard Mayrhofer, St. Georgen/Gusen (AU)

(73) Assignee: Miba Frictec GmbH, Laakirchen (AT)

( * ) Notice: Subject to any disclaimer, the term of this patent is extended or adjusted under 35 U.S.C. 154(b) by 806 days.

(21) Appl. No.: 12/249,048

(22) Filed: Oct. 10, 2008

(65) Prior Publication Data
US 2009/0236191 A1    Sep. 24, 2009

(30) Foreign Application Priority Data

Oct. 10, 2007    (AT) ................................ A 1608/2007

(51) Int. Cl.
*F16D 65/04*    (2006.01)
(52) U.S. Cl. ................................ 188/250 B; 188/251 A
(58) Field of Classification Search ............... 188/250 B, 188/250 E, 251 A, 251 M, 73.1, 3.17; 192/107 M
See application file for complete search history.

(56) References Cited

U.S. PATENT DOCUMENTS

| | | | | |
|---|---|---|---|---|
| 4,050,619 A | * | 9/1977 | Tarr ................................ | 228/162 |
| 4,278,153 A | * | 7/1981 | Venkatu .................... | 188/251 M |
| 4,501,347 A | * | 2/1985 | Cerny et al. ............... | 188/250 G |
| 5,124,118 A | | 6/1992 | Youssef et al. | |
| 5,191,955 A | * | 3/1993 | Youssef et al. ............. | 188/251 A |
| 5,339,931 A | * | 8/1994 | Jacko et al. ............... | 188/251 M |
| 5,538,108 A | * | 7/1996 | Russo ....................... | 188/250 E |
| 6,013,146 A | * | 1/2000 | Yuan et al. ................. | 156/89.22 |
| 6,139,673 A | * | 10/2000 | Sasaki et al. .................. | 156/242 |
| 6,494,301 B1 | * | 12/2002 | Wirth ............................ | 188/259 |
| 7,648,007 B2 | * | 1/2010 | Russo et al. ............. | 188/250 E |

FOREIGN PATENT DOCUMENTS

| | | |
|---|---|---|
| DE | 41 11 926 B1 | 10/1992 |
| DE | 93 06 093 U | 4/1993 |
| EP | 0 106 782 B1 | 4/1984 |
| EP | 00508423 A1 | 10/1992 |
| EP | 621415 A1 * | 10/1994 |
| FR | 1 259 664 A | 4/1961 |
| FR | 2 490 758 A1 | 3/1982 |
| JP | 2007-107066 A | 4/2007 |
| WO | 87/06315 U | 10/1987 |

OTHER PUBLICATIONS

European Search Report, EP 08017711, dated Feb. 12, 2010.

* cited by examiner

*Primary Examiner* — Robert A Siconolfi
*Assistant Examiner* — Mariano Sy
(74) *Attorney, Agent, or Firm* — Lerner, David, Littenberg, Krumholz & Mentlik, LLP

(57) ABSTRACT

The invention relates to a sintered brake lining (3) with a cylindrical friction element (4) made from a first sintered material, which has an external cylinder surface and a cylinder height (6), and with a reinforcing element (5) enclosing the friction element (4) which is disposed on the external cylinder surface and extends at least approximately across the entire cylinder height (6), and the reinforcing element (5) is made from another sintered material with a metal matrix. At least one abrasive substance is contained in the metal matrix of the other sintered material of the reinforcing element (5). The other sintered material is of a higher strength than the first sintered material of the friction element (4).

17 Claims, 1 Drawing Sheet

SINTERED BRAKE LINING

CROSS REFERENCE TO RELATED APPLICATION

In accordance with 35 U.S.C. §119, the applicant claims the priority of Austrian patent application No. A 1608/2007 of Oct. 10, 2007.

BACKGROUND OF THE INVENTION

The invention relates to a sintered brake lining with a cylindrical friction element made from a first sintered material, which has an external cylinder surface and a cylinder height, and with a reinforcing element enclosing the friction element which is disposed on the external cylinder surface and extends across at least approximately the entire cylinder height, and the reinforcing element is made from another sintered material with a metal matrix, a brake block comprising a support plate to which several sintered brake linings are secured and a track-bound vehicle disc brake incorporating at least one brake disc and at least one brake block.

The load placed on disc brakes used in track-bound vehicles is constantly rising. There are numerous reasons for this. On the one hand, speeds are becomingly increasingly high and on the other hand, the carriage weights to be decelerated are increasing or attempts are being made to obtain the same braking action with a smaller number of disc brakes. All of this leads to an extra increase in the energy to be converted, which results in even higher temperatures during the braking process. This is where organically bonded friction linings show their limits and it is for this reason that brake linings made from metal friction materials are being used for high-performance brake discs for track-bound vehicles.

For example, EP 0 106 782 B discloses a disc brake block for use in railway applications, with a rigid back plate, which has a top face and a bottom face, with a fixing clamp which is secured to the bottom face of the back plate, with a flexible, metallic support plate which is secured to the top face of the back plate, with several individual friction elements, which are each mechanically secured to the flexible, metallic support plate so that the individual elements can flex when they make contact with a disc to enable them to make full contact with the brake surface, and each friction element has a brake surface content of less than 12.6 $cm^2$ and a ratio of height to brake surface content of not more than 0.6. The friction material of the friction elements is a sintered, metal material with a base of iron. It is also possible to use several individual containers which are filled with friction material and secured to the top face of the back plate.

This arrangement of several friction elements instead of a single friction block has proved to be of particular advantage, especially in terms of functionality under extreme loads and in terms of the performance which can be achieved under wet conditions. The ways in which they are mounted on the support plate range from welding on the friction elements via constructions, whereby the elements are retained by means of intermediate plates, to fitting the friction elements by means of high-temperature soldering processes.

However, the intrinsic strength of friction elements produced in this manner is not sufficient to withstand the high loads which occur during use. One possible way of achieving it is to use casings made from steel plates in the form of rings or pots, as described in the EP-A specification. However, the disadvantage of this is the fact that these plates crease during the braking process, causing wear as a result. This then leads to a change in friction behavior and damages the brake disc.

Another known option is to use so-called reinforcing rings, as described in DE 41 11 926 A. This DE-A describes a multi-element sintered brake lining for partial linings of brake discs for track-bound vehicles in particular, comprising a single or multi-part support plate on the front face of which, facing the friction surface of the brake disc, cylindrical sintered elements are disposed and on the rear face of which a dovetail is provided for securing the brake lining in the brake shoe holder, and the cylindrical sintered elements are each provided with a reinforcing ring which is fixedly connected to the support plate and/or to the sintered element and the height of which extends as far as the wear boundary, and the material of the reinforcing rings has approximately the same wear and friction properties as the sintered elements. The reinforcing ring may also be made from a sintered material, in which case the reinforcing ring can be soldered to or sintered onto the sintered element. To this end, the material of the reinforcing ring is selected so that a coefficient of expansion essentially maintains the shrink fit between the sintered element and reinforcing ring. In order to maintain the shrink fit, it is necessary for both the reinforcing ring and the friction elements to have more or less the same coefficients of expansion. The disadvantage of this is that if wear of the brake lining results in the brake disc touching the reinforcing ring, a change in braking behavior occurs due to the material of the reinforcing ring on the one hand and due to the change, i.e. the increase in available brake surface, on the other hand. Another problem is that this design is restricted to only a few material combinations, due to the fact of having to use identical coefficients of heat expansion as mentioned above. On this subject, DE 93 06 093 U also mentions the fact that strong vibrations occur during operation, which ultimately cause the brake lining described in DE 41 11 926 A to break. Furthermore, fitting brake elements and/or their base plates by welding alone is not enough to achieve the desired strength for the connection of the brake elements to the support plate.

In order to solve this problem, DE 93 06 093 U proposes a brake lining for disc brakes, in particular for high-speed track-bound vehicles, with a single or multi-part support plate, on the front face of which, facing the friction surface of the brake disc, individual brake elements are disposed, and on the rear face of which a fitting or guide is provided for the brake lining, and at least one brake element is connected to a base plate which is in turn connected to the support plate which extends to the side of the brake element and/or is part of a basket enclosing the brake element open towards the front face, and the base plate of the basket of the brake element placed on the support plate is secured to the support plate by means of a first connection and is secured to the support plate at its face remote from the brake element by means of a second connection, and one of the two connections is a welded connection whilst the other connection is a mechanical connection or both connections are welded connections, by which the base plate of the basket placed on the support plate is connected to the support plate at several points of its casing by both press welding and by protective gas welding at its face remote from the brake element.

BRIEF SUMMARY OF THE INVENTION

The objective of this invention is to propose a brake lining with improved properties.

This objective is achieved due to the fact that at least one abrasive substance is contained in the metal matrix of the other sintered material of the reinforcing element used for the sintered brake lining proposed by the invention, and the other sintered material is of a higher strength than the first sintered material of the friction element and, independently, is also achieved on the basis of a brake block incorporating the sintered brake linings proposed by the invention and by a track-bound vehicle disc brake in which the brake block is that proposed by the invention.

The advantage of this is that, because the reinforcing element or the reinforcing ring is of the same height as the actual friction element itself, the latter is surrounded by the reinforcing element across the entire height in a casing-type arrangement, and the reinforcing element also contributes to the coefficient of friction and wear behavior of the brake lining from the outset, which means that the friction behavior can not change during the entire service life of the brake lining due to an alteration in the composition at the friction surface or due to a change in the brake surface. Any damage to the brake discs which would occur with the prior art can therefore be prevented. Furthermore, the higher strength of this sintered material compared with the sintered material of the friction element imparts to the latter a corresponding stability in order to protect it from being destroyed by the heat which occurs during braking. As a result, this obviates the need to shrink fit the friction element in the reinforcing element.

The proportion of abrasive substance or abrasive substances in the other sintered material may be selected from a range with a lower limit of 1% by weight and an upper limit of 20% by weight, thereby enabling the friction behavior of the reinforcing element to be adapted accordingly. Below 1% by weight, the coefficient of friction is too low, which means that the reinforcing element no longer makes a sufficient or the desired contribution to the friction behavior of the brake lining, whereas above 20% by weight, impairment to the strength is observed due to too low a proportion of metal matrix in the sintered material.

In particular, the proportion of abrasive substance or abrasive substances in the other sintered material may be selected from a range with a lower limit of 7.5% by weight and an upper limit of 20% by weight By preference, the least one abrasive substance is selected from a group comprising carbides, such as silicium carbide or titanium carbide, oxides, such as corundum ($Al_2O_3$) or chromium oxide ($Cr_2O_3$) or zirconium oxide ($ZrO_2$), silicates such as quartz sand, as well as mixtures thereof. These abrasive substances have a correspondingly good thermal stability so that the sintered brake lining also withstands the higher temperatures of high-speed trains during braking without the brake lining losing the desired strength.

The proportion of metal matrix in the other sintered material may be at least 75% by weight. Below 75% by weight, a drop in mechanical strength would be observed.

Preferably, the proportion of metal matrix in the other sintered material of the reinforcing element is selected from a range with a lower limit of 85% by weight and an upper limit of 95% by weight.

The metal matrix may be provided in the form of at least one metal or a metal alloy with a Rockwell hardness selected from a range with a lower limit of 55 HRR and an upper limit of HRR, which not only improves the stability of the sintered brake lining but also the friction behavior of the other sintered material because the metal matrix contributes to the friction behavior to a greater extent.

The metal matrix may also be provided in the form of at least one metal or a metal alloy with a Rockwell hardness selected from a range with a lower limit of 60 HRR and an upper limit of 80 HRR.

By preference, the metal matrix is made up of at least one element selected from a group comprising copper, iron, or alloys thereof with zinc or tin, such as brass or bronze, or mixtures thereof, as a result of which the wear behavior of the reinforcing element can be improved and the abrasive substances are also better incorporated in the matrix.

The reinforcing element may have a wall thickness selected from a range with a lower limit of 2 mm and an upper limit of 10 mm, which also leads to an improvement in the strength of the sintered brake lining, thereby also improving the way the actual friction element is retained in this reinforcing element.

In particular, the reinforcing element may have a wall thickness selected from a range with a lower limit of 3 mm and an upper limit of 5 mm.

In order to improve the wear behavior of the other sintered material of the reinforcing element, at least a proportion of the abrasive substance may be replaced by at least one solid lubricant.

By preference, this solid lubricant is selected from a group comprising sulfides, such as molybdenum sulfide, tungsten sulfide, manganese sulfide, tin sulfide, copper sulfide and mixtures thereof, because these solid lubricants do not exhibit any significant impairment to their behavior, even at the high temperatures which occur when braking high-speed trains, and hence also to the wear behavior of the reinforcing element.

The at least one solid lubricant may be used in the other sintered material in a proportion selected from a range with a lower limit of 1% by weight and an upper limit of 7% by weight so that the desired friction and wear behavior of the other sintered material can be adapted to a range of different sintered materials used for the friction element.

The reinforcing element may be joined to the friction element by a material join, in particular by its full surface, thereby further improving the mechanical stability of the sintered brake lining.

The material join is preferably obtained by soldering the friction element to the reinforcing element, in which case a film-type weld is disposed between the friction element and the reinforcing element, which not only makes it easy to produce the sintered brake lining because this weld film can be easily applied, but also enables the friction element to be joined to the reinforcing element by a large surface, enabling higher mechanical stability to be obtained.

In this respect, the film-type weld of one embodiment is of a height which is bigger than the cylinder height of the friction element, in particular it extends beyond a bottom face of the friction element, in other words the face which does not co-operate with the brake disc when the sintered brake lining is in the fitted state, so that this solder film can also simultaneously be used to join the sintered brake lining to a support plate, which also simplifies the process of producing a brake block.

The film-type weld may have a wall thickness selected from a range with a lower limit of 0.05 mm and an upper limit of 0.3 mm, which makes this solder film easier to handle and ensures that the friction behavior of the sintered brake lining is not detrimentally affected by this solder film.

By preference, a solder film with a wall thickness selected from a range with a lower limit of 0.1 mm and an upper limit of 0.2 mm is used.

A ratio of the sintered density of the other sintered material to the sintered density of the first sintered material may be selected from a range with a lower limit of 0.9:1 and an upper limit of 1.15:1, which on the one hand improves the mechanical stability of the sintered brake lining and on the other hand, although the reinforcing element is partially responsible for the friction behavior of sintered brake lining, the main load is made available via the friction element as such.

It is also possible for the other sintered material to have a coefficient of friction with respect to steel which is higher by a factor of 1.05 to 1.20 than the coefficient of friction with respect to steel of the first sintered material, as a result of which reinforcing elements with a slimmer wall thickness can be used and also, the actual friction behavior can be determined by the friction element itself.

BRIEF DESCRIPTION OF THE DRAWINGS

To provide a clearer understanding of the invention, it will be described in more detail below with reference to examples illustrated in the appended drawings. The drawings provide highly simplified, schematic diagrams as follows.

DETAILED DESCRIPTION

Figure 1:
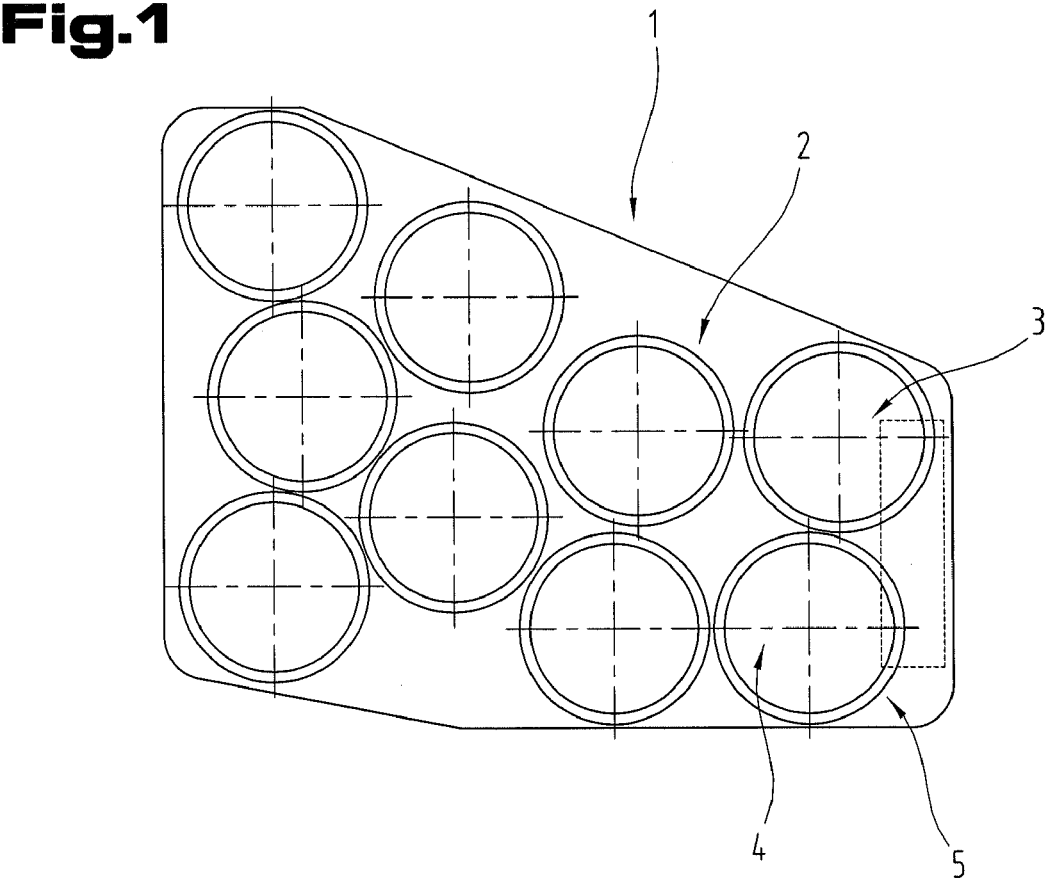
FIG. 1 is a plan view of a right-hand brake block.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

For the sake of avoiding repetition, reference may explicitly be made to the explanations given above in connection with the description given below.

FIG. 1 shows a brake block 1 in the form of a right-hand brake plate. In terms of its geometric external dimensions and its shape, this brake block 1 may be of a design corresponding to that known from the prior art, such as described in DE 41 11 926 A1, for example. This brake block 1 is preferably used in disc brake systems of track-bound vehicles, in particular high-speed track-bound vehicles.

The brake block 1 comprises a base plate 2, on the front face of which, in other words the face directed towards the brake disc in the assembled state, several sintered brake linings 3 are disposed, in particular joined to the base plate 2. A fixing means, may be disposed on the rear face of the base plate 2, for example a dovetail of the type known from the prior art.

Although in the embodiment illustrated as an example in FIG. 1 these sintered brake linings 3 have a circular cross-section, it would naturally also be possible to opt for other cross-sectional shapes within the scope of the invention, such as triangular, hexagonal, square, polygonal, trapezoidal, etc. Likewise, the distribution of the sintered brake linings 3 across the surface of the base plate 2 is not restricted to that of the brake block 1 illustrated in the diagram of FIG. 1 and instead, it would be possible to opt for a different distribution and different number of sintered brake linings 3 on the base plate 2, and this will depend on the respective intended purpose of the brake block 1 and sintered brake lining 3.

Figure 2:
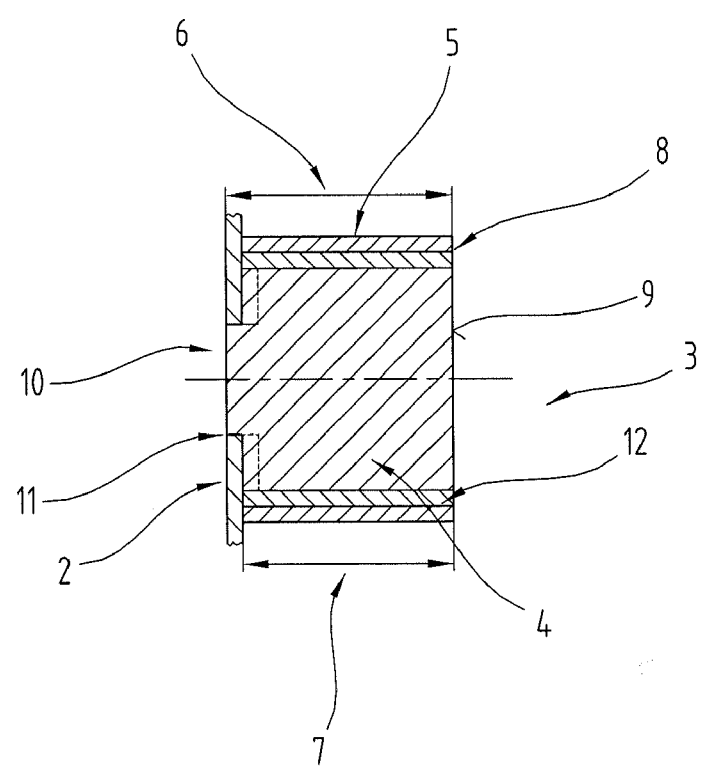
FIG. 2 is a side view in section showing a sintered brake lining.

The sintered brake linings 3 each comprise a friction element 4 and a reinforcing element 5, and the reinforcing element 5 extends along the friction element 4 at an external surface of the friction element 4, at least approximately across the entire height of the friction element 4. The expression "at least" is intended to mean that, as illustrated in FIG. 2, the friction element 4 in this embodiment of the invention has a cylinder height 6 which is bigger than an extra height 7 by which the friction element 4 extends beyond the base plate 2. In any event, an end face 8 of the reinforcing element 5 is disposed at the same height as a friction surface 9 of the friction element 4 which co-operates with the surface of the brake disc when the brake block 1 is in the assembled state.

Although FIG. 1 shows only a right-hand brake plate, it is naturally also possible within the scope of the invention for this to be a left-hand brake plate, in which case it will be essentially of a design identical to the right-hand brake plate but in mirror image.

In the case of the embodiment of the sintered brake lining 3 illustrated in FIG. 2, the base plate 2 has a cut-out 10 for each friction element 4, and this cut-out 10 may extend continuously through the base plate 2 or may also be provided in the form of a recess, and the friction element 4 extends into this cut-out 10, for which purpose the friction element 4 has an extension 11 at its surface facing the surface of the base plate 2 which matches the geometry of the cut-out 10, i.e. its cross-section. This permits a better connection and positioning of the friction element 4 and sintered brake lining 3 with respect to the base plate 2.

As may also be seen from this embodiment, a solder film is disposed between the friction element 4 and the reinforcing element 5, by means of which a full-surface connection can be obtained between the friction element 4 and the reinforcing element 5 across the entire height, i.e. the entire extra height 7, in particular a material connection.

The solder film 12 may also be such that its height is selected so that it is bigger than the extra height 7 and this solder film 12 stands proud of the surface of the sintered friction lining 3 facing the base plate 2 so that when the sintered brake lining 3 is in the state fitted on the base plate 2, this solder film 12 is bent round and thus extends at least more or less parallel with the base plate 2, as indicated by broken lines in FIG. 2, thereby offering the possibility of establishing an additional connection to the base plate 2 by means of this solder film 12. This solder film 12 may also optionally extend into the region of the cut-out 10.

The sintered brake lining 3 can therefore be directly joined to the base plate 2 by means of this solder film 12, thereby obviating the need for additional welding, etc.

By contrast with the embodiment illustrated as an example in FIG. 2, another possibility is for this solder film 12, i.e. the extra amount of solder film 12 extending across the extra height 7, not to run underneath the friction element 4 but to turn outwards by 180° standing out from the base plate 2 across the sintered brake lining 3.

Another option is to select the length of the extra amount of solder film 12 differently, which means that that this solder film 12 may also extend across only a part-region of the base plate 2 underneath the sintered brake lining 3 illustrated in FIG. 2.

The friction element 4 is made from a first sintered material, of a type already known from the prior art. For example, it may be based on typical compositions as follows.

| | | |
|---|---|---|
| 60.0-80.0% by weight | copper | |
| 0-5.0% by weight | iron | |
| 5.0-10.0% by weight | synthetic graphite | |
| 2.0-10.0% by weight | natural graphite | |
| 5.0-15.0% by weight | hard substance (e.g.: silicates, carbides, oxides, iron alloys) | |

A typical representative of this group is lining quality MD 550 produced by the applicant.

As proposed by the invention, the reinforcing element 5 is also made from another sintered material, corresponding to the explanation given above.

In order to manufacture this sintered brake lining 3, it is possible to produce the reinforcing element 5 by powder metallurgy separately from the friction element 4 and to push this reinforcing element 5 over the friction element 4 with the solder film 12 disposed in between.

Alternatively, since both the reinforcing element 5 and the friction element 4 are each made from a sintered material, another option is to manufacture the reinforcing element 5 by powder metallurgy in a first step by making a green compact, after which the cut-out defined by the reinforcing element 5 is filled with the powder for the friction element 4 and compressed to form a green compact for the sintered brake lining 3, which is then sintered so that the reinforcing element 5 can also be sintered with the friction element 4 without providing the solder film 12 in between. By preference, however, the design incorporating the solder film 12 results in a better connection between the friction element 4 and reinforcing ring 5.

This solder film 12 is preferably adjusted so that during the actual process of soldering the friction element 4 and reinforcing element 5 onto the base plate 2, the friction element 4 can then be additionally soldered to the reinforcing element 5. The advantage of this is that the coefficients of expansion of the friction element 4 and of the reinforcing element 5 may be different, which means that there is no longer any need for a shrink fit.

In terms of solder, it is preferable to use high-temperature solders, for example with a base of copper, copper-zinc solder or precious metal solders. However, it is preferable to use a solder film 12 which is at least long enough or high enough to ensure that a solder film 12 is provided across the entire gap between the reinforcing element 5 and friction element 4, thereby enabling a full-surface solder joint to be obtained between these two elements.

Another advantage of the invention is that the composition of the other sintered material for the reinforcing element 5 can be formulated so that the respective friction and wear properties required are adapted to the respective friction element 4 surrounded by it, and these can be easily made by powder metallurgy.

Examples of embodiments were produced in the form of reinforcing elements 5, in particular reinforcing rings, as set out below.

| | |
|---|---|
| Example 1: | 50% by weight copper |
| | 25% by weight brass |
| | 15% by weight iron |
| | 3% by weight manganese sulfide |
| | 7% by weight aluminum oxide |
| Example 2: | 50% by weight copper |
| | 15% by weight bronze |
| | 15% by weight brass |
| | 15% by weight iron |
| | 5% by weight quartz sand |
| Example 3: | 70% by weight copper |
| | 20% by weight iron |
| | 3% by weight tungsten sulfide |
| | 7% by weight silicium carbide |
| Example 4: | 65% by weight copper |
| | 20% by weight brass |
| | 5% by weight molybdenum sulfide |
| | 10% by weight aluminum oxide |

At this stage, it should be pointed out that it is not absolutely necessary to use a solid lubricant, in which case the proportion of abrasive substances or hard particles can be increased in accordance with the proportion of solid lubricant used in examples 1, 3 and 4 above.

In order to produce these reinforcing elements 5, the respective powders were mixed with one another and then compacted in a pressing die at a pressure of between 200 and 800 MPa (max. 1100 MPa) in one direction to form a green compact.

Instead of compacting in only one direction, it is also possible to produce this green compact by two-directional or isostatic compaction.

These green compacts were then sintered at a temperature of between 900° C. and 1050° C.

The embodiments illustrated as examples represent possible variants of the sintered brake lining 3 and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the brake lining 3 and the brake block 1, they and their constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1 and 2 constitute independent solutions proposed by the invention in their own right. The objectives and associated solutions proposed by the invention may be found in the detailed descriptions of these drawings.

The invention claimed is:

1. A sintered brake lining with a cylindrical friction element made from a first sintered material, which has an external cylinder surface and a cylinder height, and with a reinforcing element enclosing the friction element which is disposed on the external cylinder surface and extends at least approximately across the entire cylinder height, and the reinforcing element is made from a second sintered material with a metal matrix, wherein at least one abrasive substance is contained in the metal matrix of the second sintered material of the reinforcing element and the second sintered material is of a higher strength than the first sintered material of the friction element.

2. The sintered brake lining according to claim 1, wherein a proportion of the abrasive substance or the abrasive substances in the second sintered material is selected from a range with a lower limit of 1% by weight and an upper limit of 20% by weight.

3. The sintered brake lining according to claim 1, wherein the at least one abrasive substance is selected from a group comprising carbides, oxides, silicates, and mixtures thereof.

4. The sintered brake lining according to claim 1, wherein a proportion of metal matrix in the second sintered material is at least 75% by weight.

5. The sintered brake lining according to claim 1, wherein the metal matrix is provided in the form of at least one metal or a metal alloy which has a Rockwell hardness selected from a range with a lower limit of 55 HRR and an upper limit of 90 HRR.

6. The sintered brake lining according to claim 1, wherein the metal matrix is made up of at least one element selected from a group comprising copper, iron, or alloys with zinc or tin, and mixtures thereof.

7. The sintered brake lining according to claim 1, wherein the reinforcing element has a wall thickness selected from a range with a lower limit of 2 mm and an upper limit of 10 mm.

8. The sintered brake lining according to claim 1, wherein at least a proportion of the abrasive substance is replaced by at least one solid lubricant.

9. The sintered brake lining according to claim 8, wherein the at least one solid lubricant is selected from a group comprising molybdenum sulfide, tungsten sulfide, manganese sulfide, tin sulfide, copper sulfide, and mixtures thereof.

10. The sintered brake lining according to claim 9, wherein a proportion of the at least one solid lubricant in the second sintered material is selected from a range with a lower limit of 1% by weight and an upper limit of 7% by weight.

11. The sintered brake lining according to claim 1, wherein the reinforcing element is connected to the friction element by a material joint.

12. The sintered brake lining according to claim 11, wherein the material joint is produced by soldering the friction element to the reinforcing element, and a film soldered joint is formed between the friction element and the reinforcing element.

13. The sintered brake lining according to claim 12, wherein the film soldered joint has a wall thickness selected from a range with a lower limit of 0.05 mm and an upper limit of 0.3 mm.

14. The sintered brake lining according to claim 1, wherein a ratio of a sintered density of the second sintered material to a sintered density of the first sintered material is selected from a range with a lower limit of 0.85:1 and an upper limit of 1.15:1.

15. The sintered brake lining according to claim 1, wherein the other second sintered material has a coefficient of friction with respect to steel that is higher than a coefficient of friction with respect to the first sintered material by a factor selected from a range with a lower limit of 1.05 and an upper limit of 1.20.

16. A brake block comprising a base plate to which several sintered brake linings are secured, wherein the sintered brake linings are as claimed in claim 1.

17. A track-bound vehicle disc brake comprising at least one brake disc and at least one brake block, wherein the brake block is as claimed in claim 16.

\* \* \* \* \*

UNITED STATES PATENT AND TRADEMARK OFFICE
CERTIFICATE OF CORRECTION

PATENT NO. : 8,196,719 B2
APPLICATION NO. : 12/249048
DATED : June 12, 2012
INVENTOR(S) : Gerhard Mayrhofer Page 1 of 1

It is certified that error appears in the above-identified patent and that said Letters Patent is hereby corrected as shown below:

Title Page (75) Inventor, "(AU)" should read --(AT)--.

In the Specification
Column 3, line 57, "of HRR" should read --of 90 HRR--.

Signed and Sealed this
Tenth Day of September, 2013

Teresa Stanek Rea
*Acting Director of the United States Patent and Trademark Office*